US012172431B2

(12) United States Patent
Calderon

(10) Patent No.: US 12,172,431 B2
(45) Date of Patent: Dec. 24, 2024

(54) STORAGE HOLDERS INCLUDING ITEM RETAINERS FOR POSITIONING IN DIFFERENT POSITIONS ALONG A VERTICAL DIRECTION FOR HOLDING AND STORING DIFFERENT SIZED ITEMS, GAUGES FOR MEASURING AN AMOUNT OF AN ITEM REMAINING, AND RELATED METHODS

(71) Applicant: Alirio Calderon, Cary, NC (US)

(72) Inventor: Alirio Calderon, Cary, NC (US)

( * ) Notice: Subject to any disclaimer, the term of this patent is extended or adjusted under 35 U.S.C. 154(b) by 259 days.

(21) Appl. No.: 17/943,531

(22) Filed: Sep. 13, 2022

(65) Prior Publication Data

US 2023/0100116 A1 Mar. 30, 2023

Related U.S. Application Data

(60) Provisional application No. 63/248,027, filed on Sep. 24, 2021.

(51) Int. Cl.
*B65H 19/12* (2006.01)
*B41J 11/58* (2006.01)

(52) U.S. Cl.
CPC .................................... *B41J 11/58* (2013.01)

(58) Field of Classification Search
CPC ........... B65H 19/12; B65H 2301/3251; B65H 2405/312; B65H 2511/12
See application file for complete search history.

(56) References Cited

U.S. PATENT DOCUMENTS 1,469,725 A 7/1922 Helenek
3,641,950 A 2/1972 Axhamre
4,528,914 A 7/1985 Montet
5,074,421 A 12/1991 Coulter
5,676,261 A 10/1997 Baughman et al.
6,123,206 A 9/2000 Zaremba
9,938,103 B1 * 4/2018 Merminod ........... B65H 16/023
(Continued)

FOREIGN PATENT DOCUMENTS

GB 2237183 A 1/1991

OTHER PUBLICATIONS

Bulman R1599 Revolving Vertical 5 Roll Walnut Suzy Rack—Assembled, Accessed on Jul. 20, 2021, website: https://www.webstaurantstore.com/bulman-r1599-revolving-vertical-5-roll-walnut-suzy-rack-assembled/188R1599A.html.

*Primary Examiner* — Sang K Kim
(74) *Attorney, Agent, or Firm* — Olive Law Group, PLLC

(57) ABSTRACT

Storage holders including item retainers for positioning in different positions a vertical direction for holding and storing different sized items, gauges for measuring an amount of an item remaining, and related methods are disclosed. According to an aspect, a storage holder includes a base member and a vertical member supported by the base member and that defines multiple apertures. The apertures are spaced apart in a vertical direction. The storage holder includes item retainers that are each configured to hold an upper portion of an item. Each item retainer can fit within an aperture of the vertical member and to hold onto the vertical member. While fitted in a respective aperture, each item retainer is moveable between a first position and a second position. In the first position, the retainer holds the upper portion in a stored position. A media gauge can be used to determine how much of an item is left.

20 Claims, 16 Drawing Sheets

(56) References Cited

U.S. PATENT DOCUMENTS

| | | | | |
|---|---|---|---|---|
| 10,219,605 | B1 * | 3/2019 | Love | A47F 5/06 |
| 2003/0015486 | A1 | 1/2003 | Chen | |
| 2013/0037503 | A1 | 2/2013 | Cimino et al. | |

* cited by examiner

1700

STORAGE HOLDERS INCLUDING ITEM RETAINERS FOR POSITIONING IN DIFFERENT POSITIONS ALONG A VERTICAL DIRECTION FOR HOLDING AND STORING DIFFERENT SIZED ITEMS, GAUGES FOR MEASURING AN AMOUNT OF AN ITEM REMAINING, AND RELATED METHODS

CROSS REFERENCE TO RELATED APPLICATION

This application claims priority to and the benefit of U.S. Provisional Patent Application No. 63/248,027, filed Sep. 24, 2021, the disclosure of which is incorporated herein by reference in its entirety.

TECHNICAL FIELD

The presently disclosed subject matter relates generally to storage holders. Particularly, the presently disclosed subject matter relates to storage holders including item retainers for positioning in different positions along a vertical direction for holding and storing different sized items, gauges for measuring an amount of an item remaining, and related methods.

BACKGROUND

Rolls of media for printing vary in width and materials. Wide format printers and sign shops use rolls of vinyl, paper, canvas and other media varying in sizes from 12 inches to 60 inches. New whole rolls as well as partial rolls need to be stored securely to prevent the roll to tip over and get damaged. In most cases, rolls are placed vertically next to each other and if one of them tips it causes a domino effect knocking other rolls to the ground and damaging multiple rolls of media at the same time. This can be costly. Therefore, there is a need to properly store such media rolls.

Media rolls can also be heavy and cumbersome to handle. Therefore, there is a need for convenient mechanisms for handling them. Particularly, since media rolls should be properly stored, it is most efficient if holders for them can accommodate easy access to them for use and placement into storage.

BRIEF DESCRIPTION OF THE DRAWINGS

Figure 1:
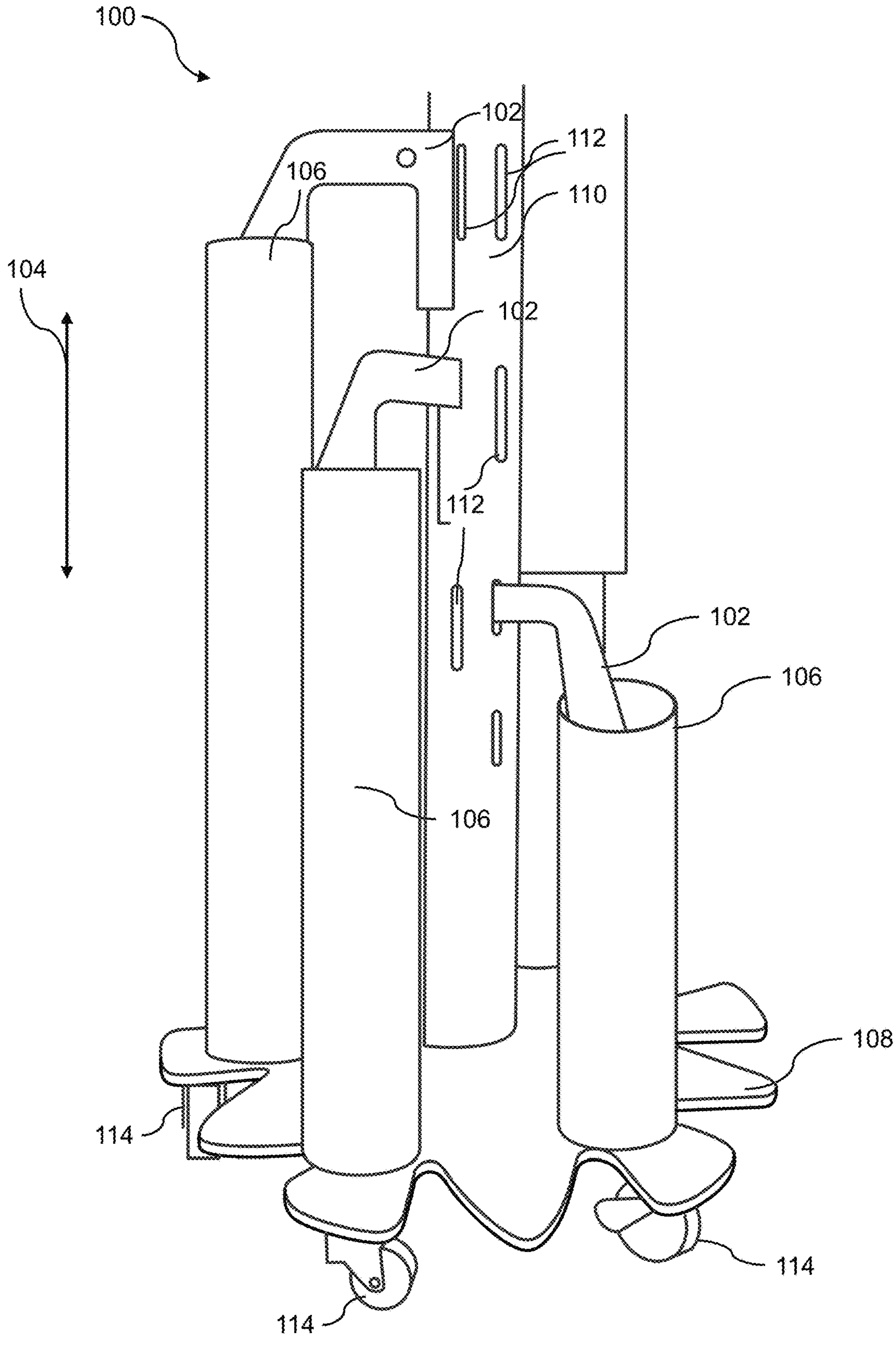
Figure 2:
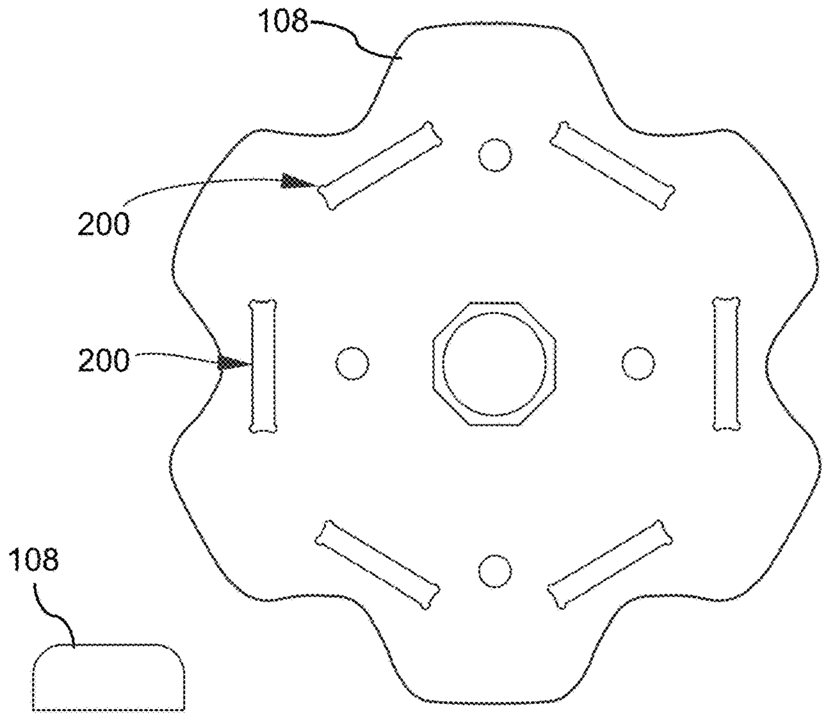
Figure 3:
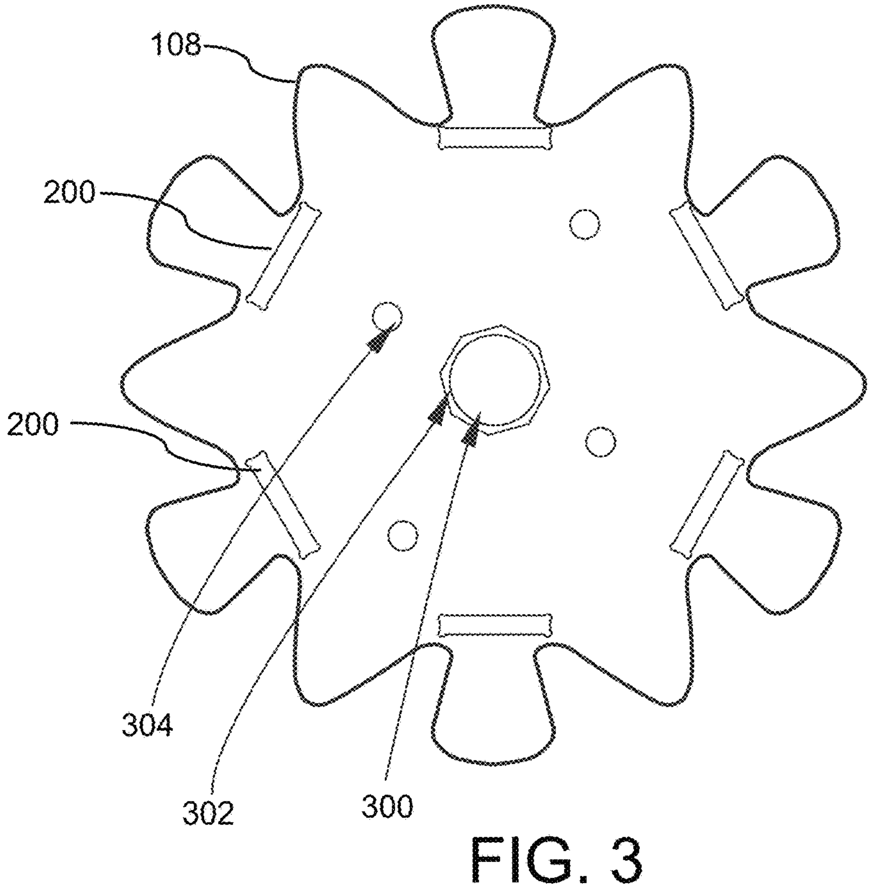
Figure 4:
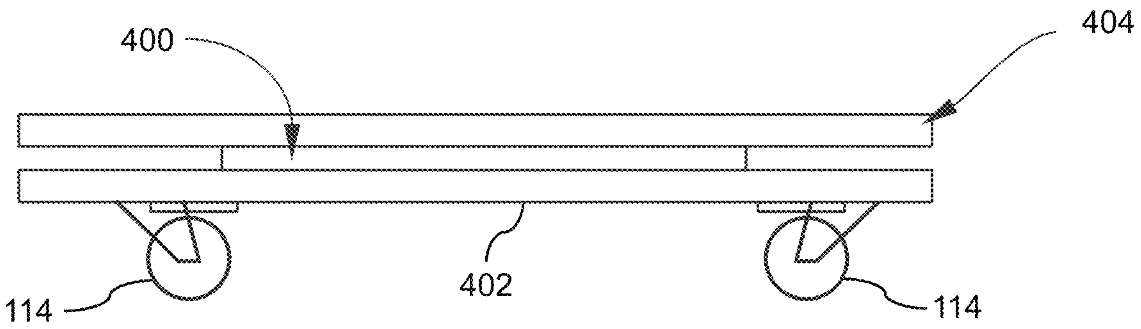
Figure 5:
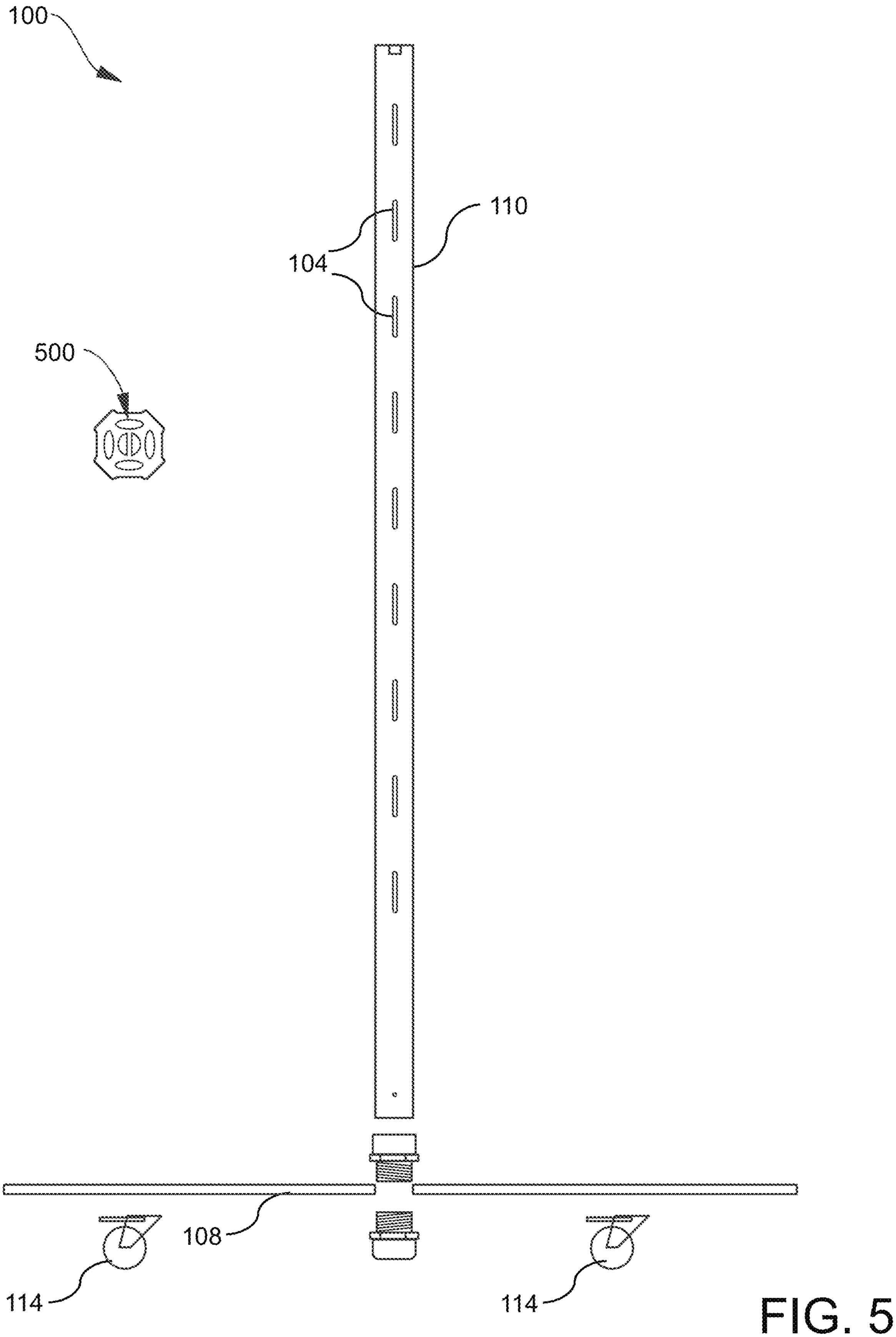
Figure 6:
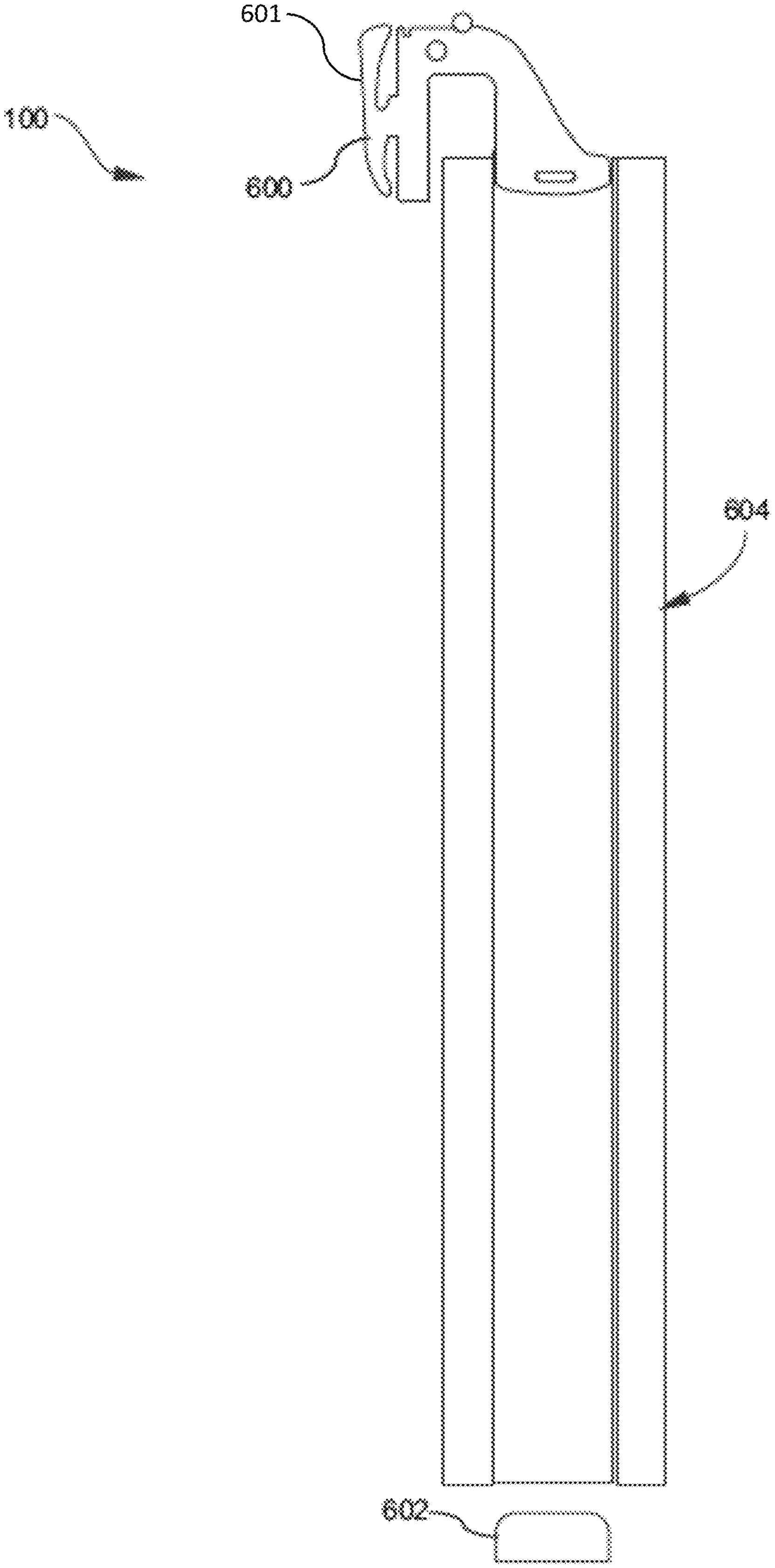
Figure 7A:
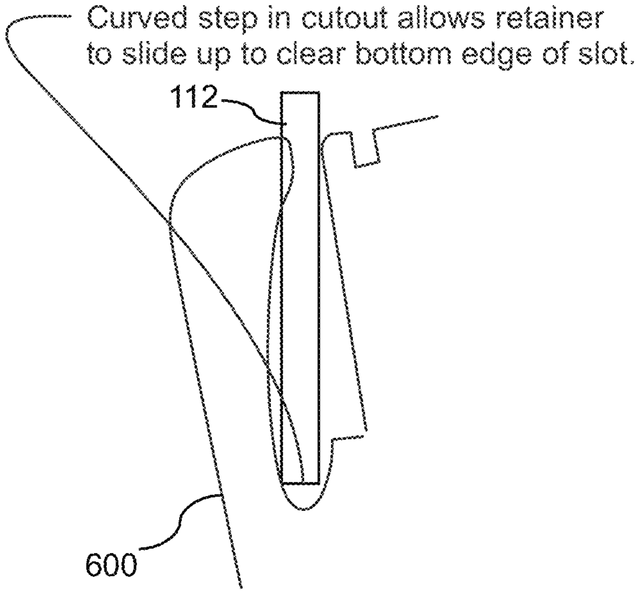
Figure 7B:
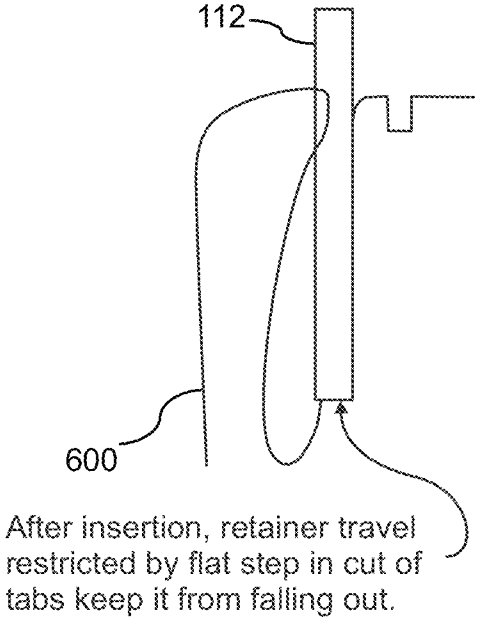
Figure 8:
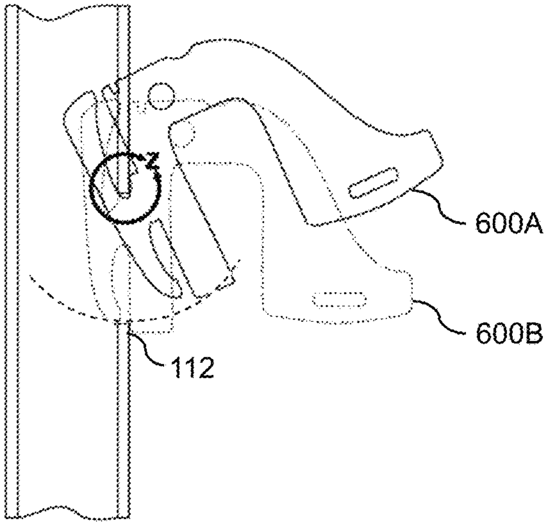
Figure 9:
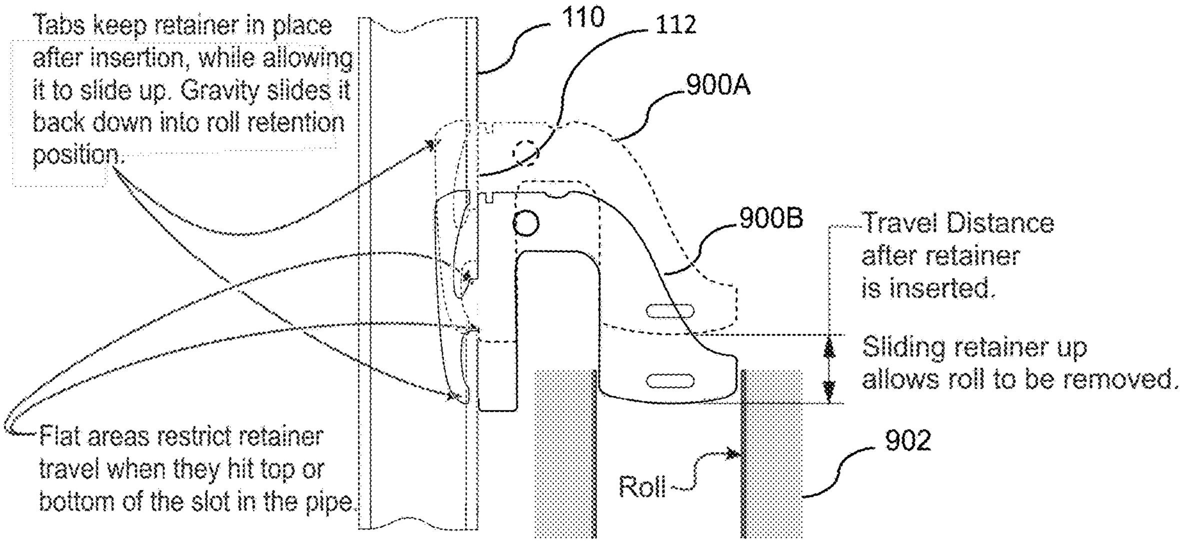
Figure 16C:
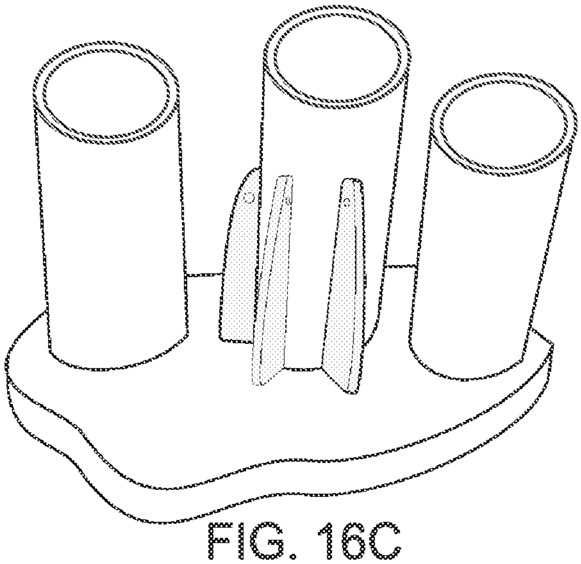
Figure 16B:
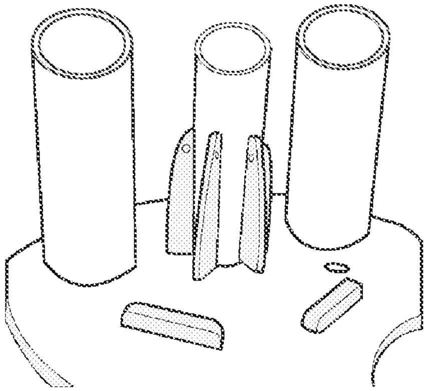
Figure 16A:
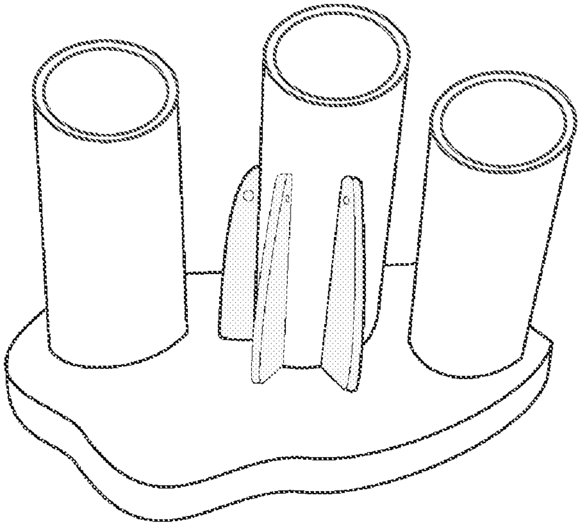
Figure 17:
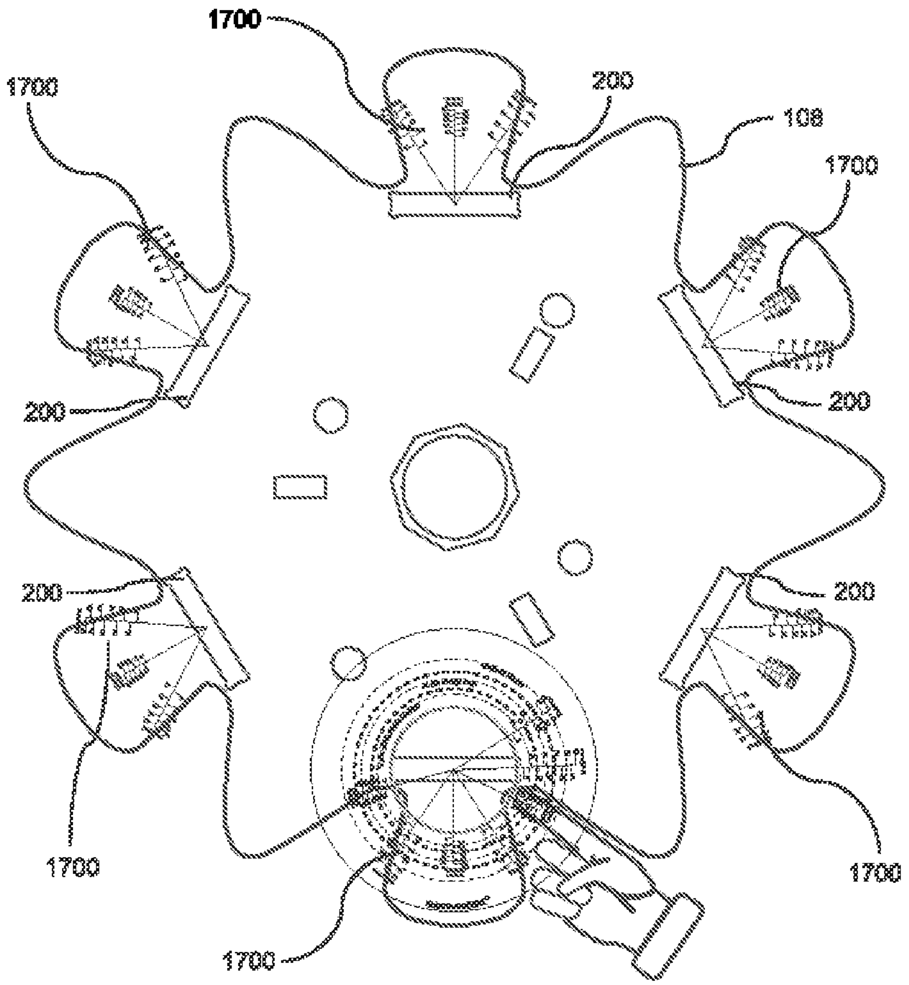
Figure 18:
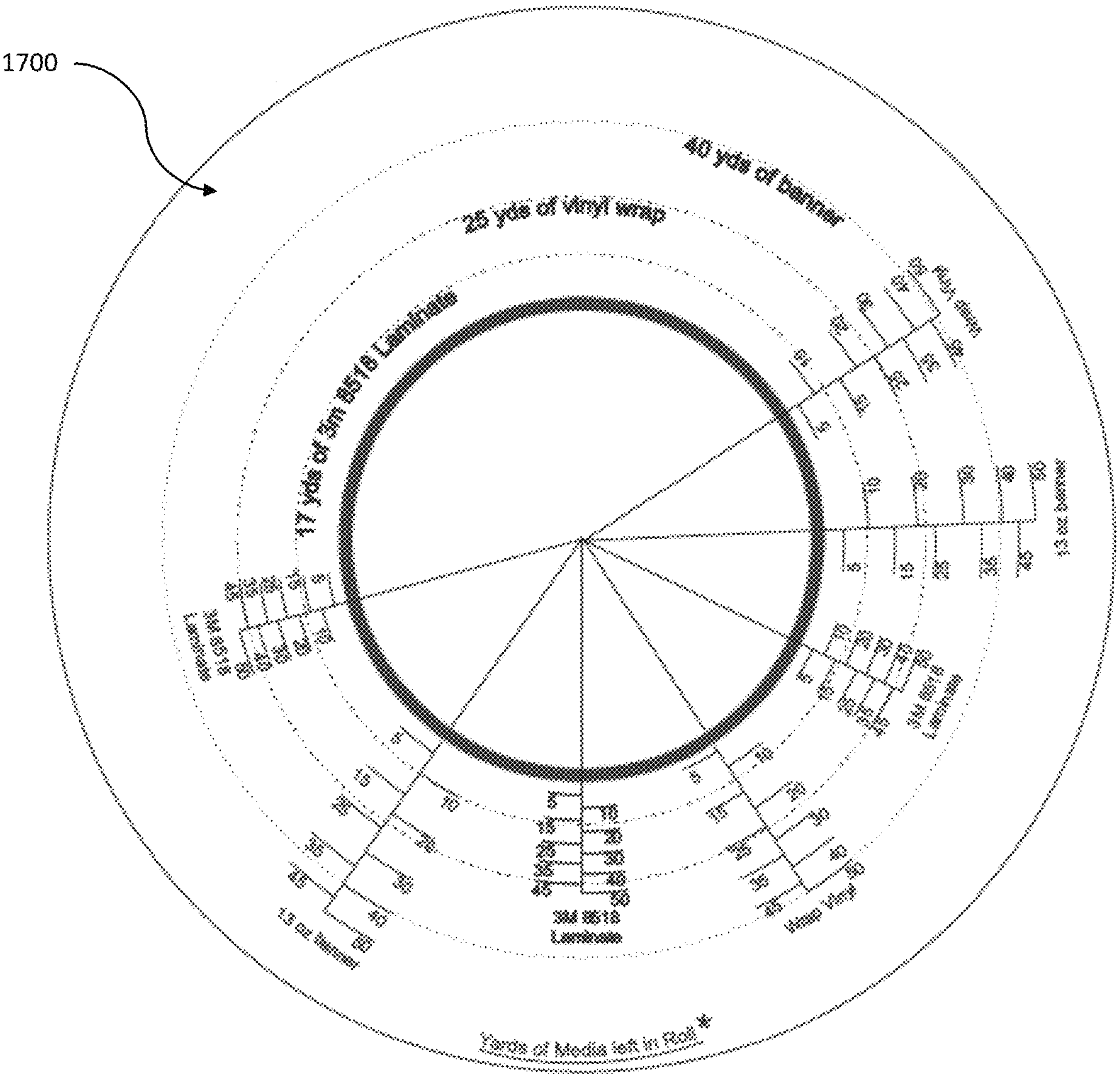

Having thus described the presently disclosed subject matter in general terms, reference will now be made to the accompanying Drawings, which are not necessarily drawn to scale, and wherein:

FIG. 1 is a perspective view of a storage holder including item retainers for positioning in different positions a vertical direction for holding and storing different sized items in accordance with embodiments of the present disclosure;

FIGS. 2 and 3 illustrate top views of base members in accordance with embodiments of the present disclosure;

FIG. 4 illustrates a side view of a base member including a "Lazy Susan" mechanism;

FIG. 5 illustrates an exploded, side view of a base member, a vertical member, wheels, and a handle of a storage holder in accordance with embodiments of the present disclosure in accordance with embodiments of the present disclosure;

FIG. 6 is a cross-sectional, side view of an item retainer and base member component arranged for holding a stored item in accordance with embodiments of the present disclosure;

FIGS. 7A and 7B illustrate zoomed-in, cross-sectional side views of the item retainer and its movement for insertion into an aperture of a vertical member in accordance with embodiments of the present disclosure;

FIG. 8 is a cross-sectional, side view of the vertical member with the item retainer in two positions depicting its rotation to fit into the aperture in accordance with embodiments of the present disclosure;

FIG. 9 is a cross-sectional, side view of the item retainer in two positions within the aperture of the vertical member for holding or releasing the media roll in accordance with embodiments of the present disclosure;

FIGS. 10A-10G are different views of a storage holder in accordance with embodiments of the present disclosure;

FIGS. 11A-11F are different views of a storage holder with another configuration for roll retention in accordance with embodiments of the present disclosure;

FIGS. 12A-12F are different views of a storage holder with another configuration for roll retention in accordance with embodiments of the present disclosure;

FIGS. 13A-13F are different views of a storage holder with another configuration for roll retention in accordance with embodiments of the present disclosure;

FIGS. 14A-14F are different views of a storage holder with another configuration for roll retention in accordance with embodiments of the present disclosure;

FIGS. 15A-15F are different views showing attachment of a vertical member to a base member in accordance with embodiments of the present disclosure;

FIGS. 16A-16C are different views showing a vertical member of a storage holder being supported by multiple buttressing components in accordance with embodiments of the present disclosure;

FIG. 17 is a top view of a base member with media gauges affixed thereto for measuring an amount of roll material in accordance with embodiments of the present disclosure; and FIG. 18 is a close up via of a media gauge in accordance with embodiments of the present disclosure.

SUMMARY

The presently disclosed subject matter relates to storage holders including item retainers for positioning in different positions along a vertical direction for holding and storing different sized items and related methods. According to an aspect, a storage holder includes a base member configured to hold a lower portion of an item. Further, the storage holder includes a vertical member supported by the base member and that defines a plurality of apertures. The apertures are spaced apart in a substantially vertical direction. The storage holder includes one or more item retainers that are each configured to hold an upper portion of an item. Each item retainer comprises a locking feature configured to fit within an aperture of the vertical member and to hold onto the vertical member. While fitted in a respective aperture, each item retainer is moveable between a first position and a second position. In the first position, the respective retainer holds the upper portion of the respective item in a stored position. In the second position, the respective retainer releases the upper portion from the stored position or receives the upper portion for storage.

In another aspect, a method for holding an item includes providing a storage holder. The storage holder includes a base member and a vertical member supported by the base member and that defines a plurality of apertures. The apertures are spaced apart in a substantially vertical direction. The method includes fitting a locking feature of an item retainer within a selected one of the apertures. While fitted in the selected aperture, the item retainer is moveable between a first position and a second position, wherein in the first position is lower than the second position. The method also includes raising the item retainer to the first position and positioning an upper portion of an item in relation to the item retainer such that the upper portion of the item is held by the item retainer. Further, the method includes positioning a lower portion of the item in relation to the base member such that the lower portion of the item is held by the base member. The item is in a stored position when the item retainer holds the upper portion and the base member holds the lower portion.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles “a” and “an” are used herein to refer to one or to more than one (i.e. at least one) of the grammatical object of the article. By way of example, “an element” means at least one element and can include more than one element.

“About” is used to provide flexibility to a numerical endpoint by providing that a given value may be “slightly above” or “slightly below” the endpoint without affecting the desired result.

The use herein of the terms “including,” “comprising,” or “having,” and variations thereof is meant to encompass the elements listed thereafter and equivalents thereof as well as additional elements. Embodiments recited as “including,” “comprising,” or “having” certain elements are also contemplated as “consisting essentially of” and “consisting” of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

FIG. 1 is a perspective view of a storage holder 100 including item retainers 102 for positioning in different positions a vertical direction (generally indicated by double arrow 104) for holding and storing different sized items 106 in accordance with embodiments of the present disclosure. Referring to FIG. 1, the storage holder 100 includes a base member 108 configured to hold a lower portion of an item 106. In this example, the items 106 are rolls of media but may alternatively be any other suitable item. The storage holder 100 also includes a vertical member 110 supported by the base member 108 and that defines multiple apertures 112. The apertures 112 are spaced apart in the vertical direction 104. The item retainers 102 are each configured (e.g., shaped) to hold an upper portion of an item 106. Each item retainer 102 can include a locking feature (not shown) configured (e.g., shaped) to fit within an aperture 112 of the vertical member 110 and to hold onto the vertical member 110.

While fitted in a respective aperture 112, each item retainer 102 is moveable between a first position and a second position. In the first position (as shown in FIG. 1), the respective retainer 102 holds the upper portion of the respective item 106 in a stored position as shown. In the second position, the respective retainer 102 releases the upper portion from the stored position or receives the upper portion for storage.

The storage holder 100 includes multiple wheels 114 operably connected to an underside of the base member 108. In this example, the wheels 114 are casters. In this way, the storage holder 100 can be moved about and rotated easily on a supporting floor. By rotating the storage holder 100, the stored items 106 can be easily accessed by a user who is stationary, such as in a sitting position or standing adjacent a work area.

In embodiments, the vertical member 110 is attached to a substantially center portion of the base member 108. The vertical member 110 can be rigidly attached to the base member 108. The apertures 112 are each shaped as a slot and they are aligned in rows along the vertical direction 104. In this example, each item 106 defines an opening at its upper portion and an opening at its lower portion. The item retainers 102 each define a protrusion (not shown) that extends in a downward direction for fitting into the opening of the upper portion of the item 106 for holding the item 106. Further, the base member 108 defines protrusions (not shown) that each extend in an upward direction for fitting into respective openings of the lower portions of the items 106 for holding the items 106.

Each item retainer 102 is configured (e.g., shaped) to rest on a lower portion of its respective aperture 112 when in the first position (i.e., the position for holding an item). Further, each item retainer 102 can touch a top portion of its respective aperture 112 when in the second position (i.e., the position for release or receipt of an item). Each retainer 102 is freely moveable between the first position and the second position along the vertical direction 104. Although not shown in FIG. 1, the storage holder 100 can also include a handle attached to the top portion of the vertical member 110 for use in rotating or otherwise moving the storage holder 100.

In an example use scenario, the storage holder 100 provides an easy and practical way to store media rolls. It can allow for loading and unloading from the top or the bottom end of the roll core. Rolls of different sizes (e.g., heights) can be stored on the same roll holder. Storage holders disclosed herein can provide an efficient way to store long rolls while preventing rolls from tipping over. The roll retainer has a unique inserting feature that allows the retainer to slide into the axis and to mechanically stay in place while allowing to slide up and down to permit the roll to be secured in place and allows the roll to be removed from either the bottom of the top of the roll. The retainer can be removed and placed at different heights for standard and/or custom roll heights. It’s rotating feature allows for compact storage while providing easy access to the rolls Rolls of media for printing vary in width and materials. Wide format printers and sign shops use rolls of vinyl, paper, canvas and other media varying in sizes from 12" to 60" for the most part. The new whole rolls as well as partial rolls need to be stored securely to prevent the roll to tip over and get damaged. In most cases rolls are placed vertically next to each other and if one of them tips it can cause a domino effect knocking other rolls to the ground and damaging multiple rolls of media at the same time. This can be costly. With this roll holder, allows the rolls of different lengths to be placed be retained in place while providing space efficient storage and easy removal of the rolls when needed for use.

In accordance with embodiments, the base member can rotate on its own on casters as shown in FIG. 1. Alternatively, the base member may be a rotatable mechanism for rotating the vertical member on its axis. For example, it may be constructed in a "Lazy Susan" fashion for rotation.

The base member may be any suitable shape and size. The base member 108 shown in FIG. 1 as a "flower" shape. The space in between the rolls is cutout or notched to permit the base to be rotated with a foot or hand. This shape can make it easier to rotate as compared to a disk. FIGS. 2 and 3 illustrate top views of base members 108 in accordance with embodiments of the present disclosure. Referring to FIGS. 2 and 3, the base members 108 have slots 200 defined therein for receipt of components (a side view of which is represented by 202) for holding bottom ends of stored items. The component 202 may be inserted and glued into a slot 200.

With continuing reference to FIGS. 2 and 3, it is noted that the base member 108 can be any suitable, alternative configuration and size. The size can depend on the number of rolls and the roll diameter. For example, the base member 108 of FIG. 2 is 16 inches in diameter, and the base member 108 of FIG. 3 is 20 inches in diameter. The base member 108 can be printed with or a decal applied to indicate length of media left in the roll based on diameter of media left in roll.

With reference to FIG. 3, reference 300 is a round through hole for a pipe (which can be the vertical member). Reference 302 is a depression defined by the base member 108 for inserting a nut that rotates the vertical member when the base member rotates. Reference 304 are optional apertures for mounting a "Lazy Susan" mechanism upon which the vertical member can rotate.

FIG. 4 illustrates a side view of a base member including a "Lazy Susan" mechanism 400 in accordance with embodiments of the present disclosure. Referring to FIG. 4, the base member includes a bottom portion 402 with wheels 114 attached to its underside. Further, the base member includes a top portion 404 that is held by the mechanism 400. This configuration enables the top portion 404 to rotate with respect to the bottom portion 402. The vertical member (not shown) can be attached to the top portion 404 to enable its rotation with respect to the bottom portion 402.

FIG. 5 illustrates an exploded, side view of a base member 108, a vertical member 110, wheels 114, and a handle 500 of a storage holder 100 in accordance with embodiments of the present disclosure. Regarding to FIG. 5, the vertical member 110 can have a suitable length based on a maximum roll height desired. In an example, the vertical member 110 can be a 2 inch PVC pipe, or any other suitable material and/or size. In this example, the vertical member 110 is a PVC pipe that is 64 inches long. Further, apertures 104 can be 6 inches apart to accommodate standard roll sizes starting with 12 inches with increments of 6 inches. Notches at the top of the vertical member 110 can be used for inserting the handle 500. The vertical member 110 can be attached with a PVC fitting within an aperture of the base member 108. The PVC fitting can have a sleeve with nut and thread mechanism.

FIG. 6 is a cross-sectional, side view of an item retainer 600 and base member component 602 arranged for holding a stored item 604 in accordance with embodiments of the present disclosure. It is noted that the item retainer 600 and the base member component 602 are the only components of the storage holder. This is for ease of illustration. Referring to FIG. 6, the stored item 604 is a media roll having an opening at its upper end and an opening at its lower end. The base member component 602 can fit inside the opening at the lower end of the stored item 604 for holding that end. The item retainer 600 can fit inside the opening at the upper end of the stored item 604 for holding that end. The item retainer 600 has a locking feature 601 configured to fit within an aperture of a vertical member (not shown in FIG. 6). The item retainer 600 can be raised and lowered for releasing and holding the stored item 604.

FIGS. 7A and 7B illustrate zoomed-in, cross-sectional side views of the item retainer 600 and its movement for insertion into an aperture 112 of a vertical member in accordance with embodiments of the present disclosure. FIG. 7A shows the curved features of the item retainer 600 and its movement for insertion into the aperture 112. FIG. 7B shows the item retainer 600 once fitted into the aperture 112 into an upper position.

FIG. 8 is a cross-sectional, side view of the vertical member 110 with the item retainer in two positions (600A and 600B) depicting its rotation to fit into the aperture 112 in accordance with embodiments of the present disclosure. In the position 600A, the item retainer is initially inserted into the aperture 112. In the position 600B, the item retainer has rotated from 600A as shown by circular arrow Z to the fitted, upper position within the aperture 112.

FIG. 9 is a cross-sectional, side view of the item retainer in two positions (upper position 900A and lower position 900B) within the aperture 112 of the vertical member 110 for holding or releasing the media roll 902 in accordance with embodiments of the present disclosure. Referring to FIG. 9, the media roll 902 is released by the item retainer and can be removed when the item retainer is in the upper position 900A. In the lower position 900B, the item retainer can hold the media roll 902.

Figure 10D:
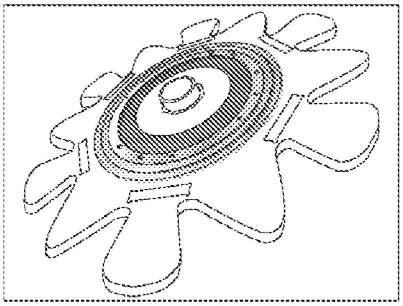
Figure 10C:
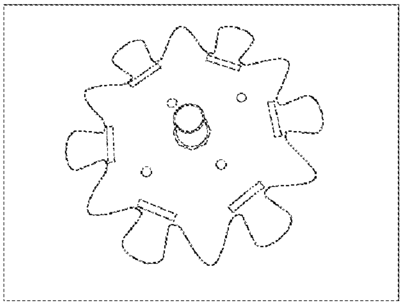
Figure 10A:
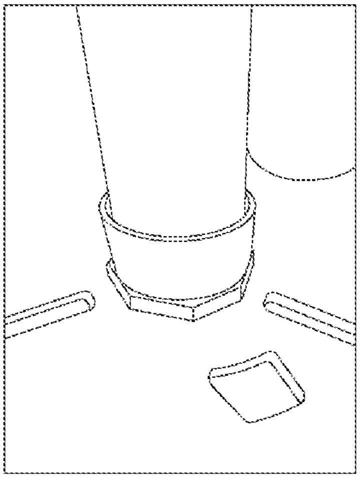
Figure 10F:
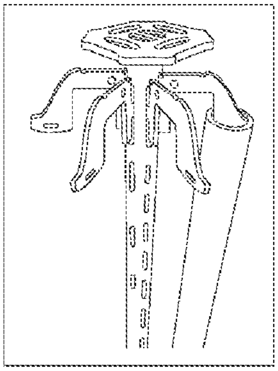
Figure 10E:
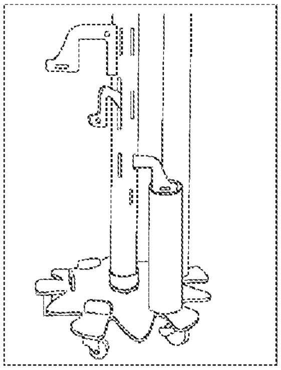
Figure 10B:
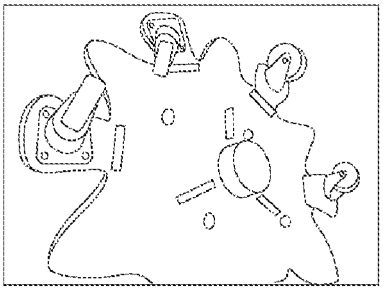

FIGS. 10A-10G are different views of a storage holder in accordance with embodiments of the present disclosure. Particularly, FIG. 10A shows a close-up, perspective view of the point of connection of the vertical member to the base member. FIG. 10B is a bottom, perspective view of the base member. FIG. 10C is a top, perspective view of the base member without attachment of the vertical member. FIG. 10D is a top, perspective view of the base member without attachment of the bottom potion for showing the "Lazy Susan" mechanism. FIG. 10E is a side view of the storage holder. FIG. 10F is a top, perspective view of the storage holder. FIG. 10G is another side view of the storage holder.

Figure 11A:
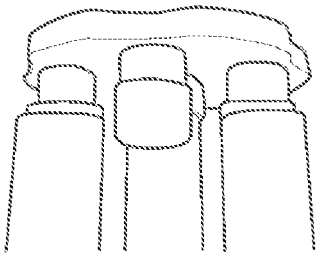
Figure 11B:
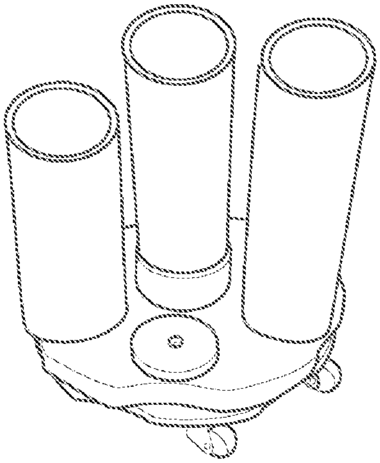
Figure 11C:
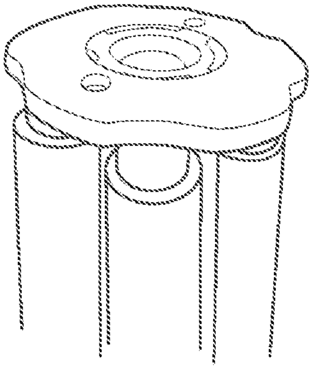
Figure 11D:
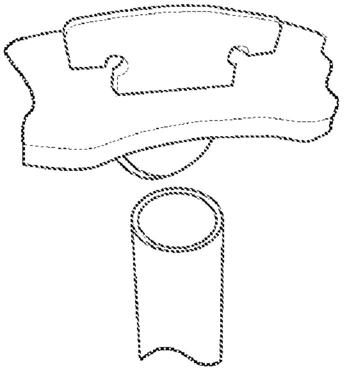
Figure 11E:
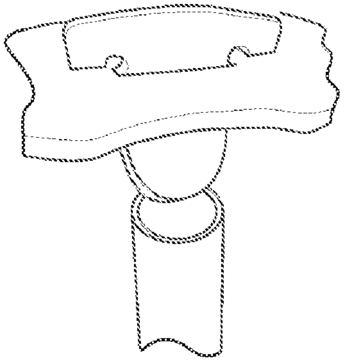
Figure 11F:
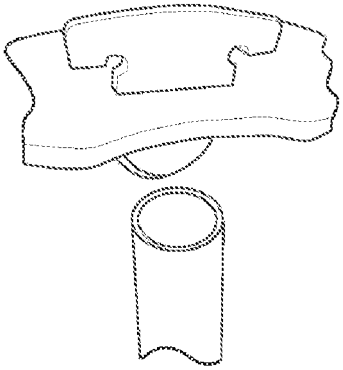

FIGS. 11A-11F are different views of a storage holder with another configuration for roll retention in accordance with embodiments of the present disclosure. Particularly, FIG. 11A shows a short pipe attached to the top component of the storage holder for holding the upper portion of the roll. FIG. 11B shows a disk-shaped component on the base member for holding the lower portion of the roll. FIG. 11C shows PVC flanges at the top and bottom to secure the vertical member. FIG. 11D shows different view of a removable, tongue-shaped component at the top for use in securing the roll in place and to allow for the roll to be removed at the top.

Figure 12A:
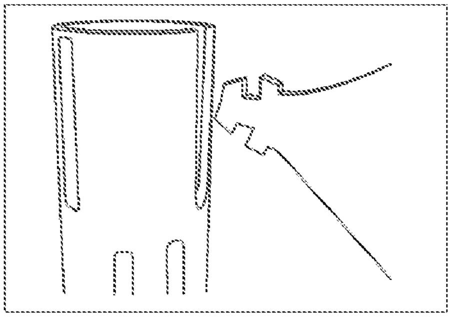
Figure 12B:
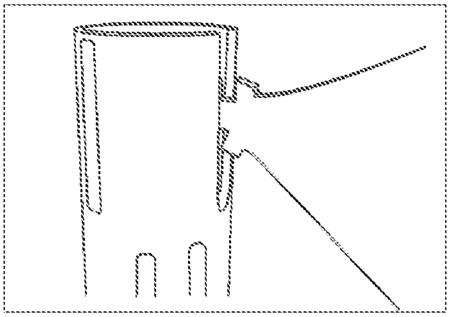
Figure 12C:
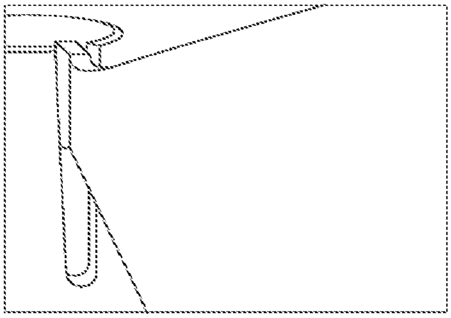
Figure 12D:
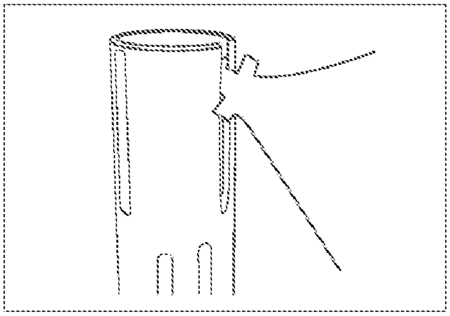
Figure 12E:
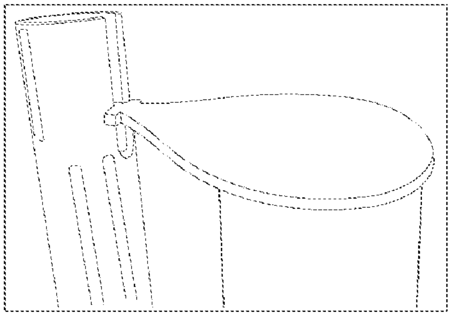
Figure 12F:
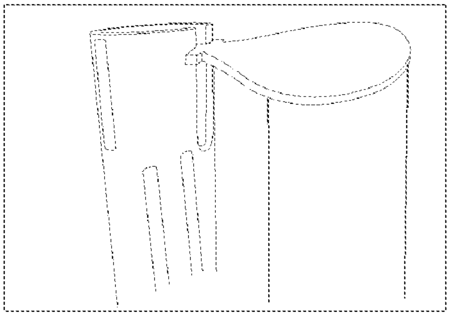
Figure 13A:
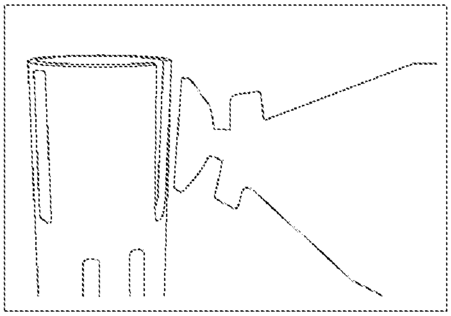
Figure 13B:
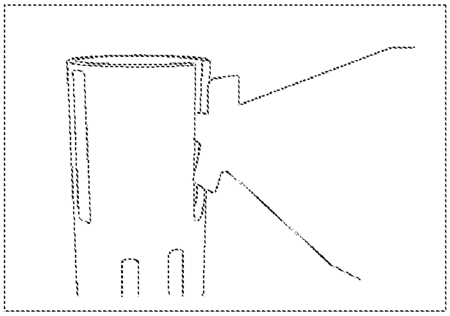
Figure 13C:
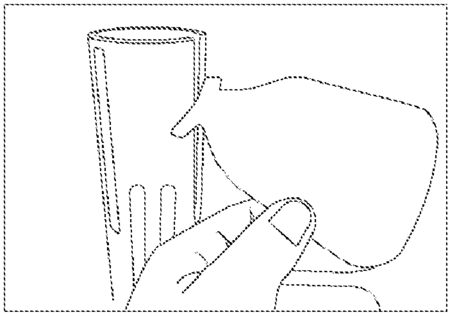
Figure 13D:
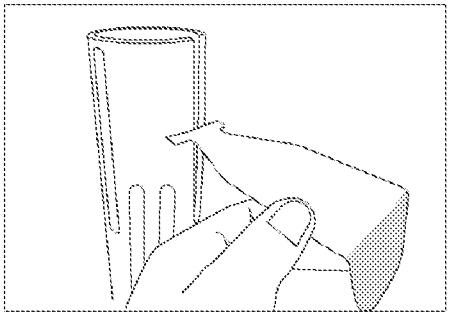
Figure 13E:
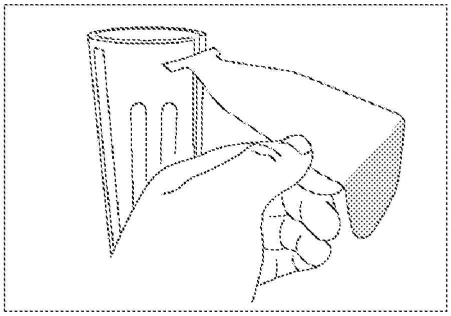
Figure 13F:
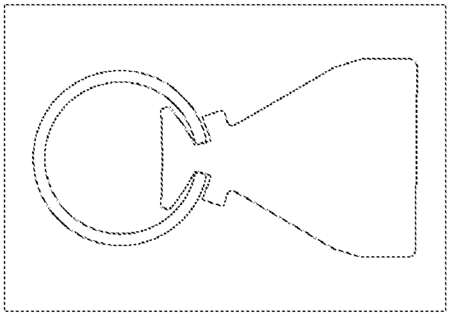
Figure 14A:
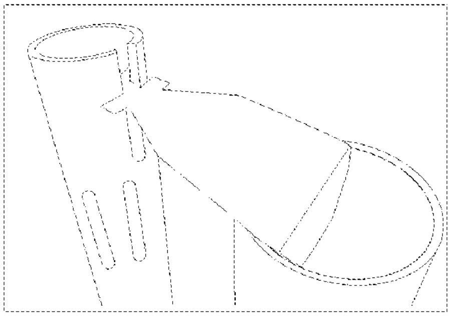
Figure 14B:
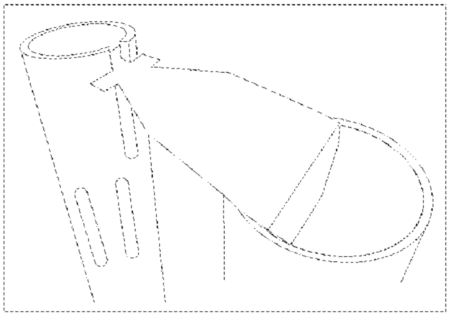
Figure 14C:
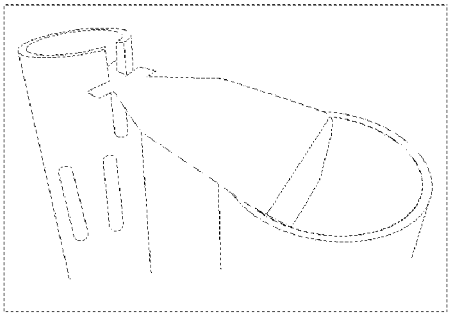
Figure 14D:
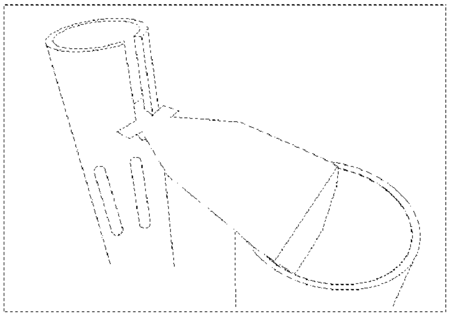
Figure 14E:
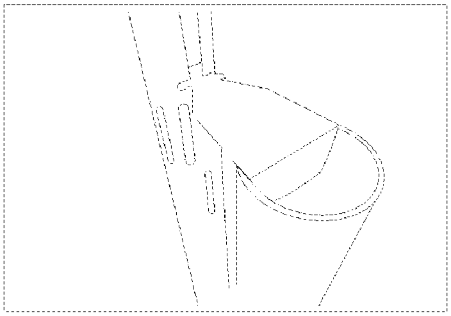
Figure 14F:
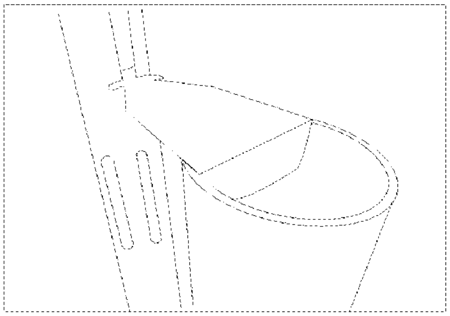

FIGS. 12A-12F are different views of a storage holder with another configuration for roll retention in accordance with embodiments of the present disclosure. Particularly, FIGS. 12A-12D show an item retainer being positioned into an aperture of a vertical member for holding a roll. As shown, the item retainer is inserted vertically and then rotated until it is positioned horizontally where it is free to move upward and downward in the slot of the aperture. It is retained by a feature that is inserted into the interior of the vertical member. FIGS. 12E and 12F shows the item retainer holding a top portion of a roll in place. This allows the roll to be removed from the top or bottom. Also, the flat shape slides down in slot due to gravity.

FIGS. 13A-13F are different views of a storage holder with another configuration for roll retention in accordance with embodiments of the present disclosure. The use of the item retainer is similar to the embodiment of FIGS. 12A-12F. In this embodiment, the item retainer is shaped flat with a folded end to fit inside the vertical member. Retention is by a feature of the item retainer that is inserted into an interior of the vertical member.

FIGS. 14A-14F are different views of a storage holder with another configuration for roll retention in accordance with embodiments of the present disclosure. The use of the item retainer is similar to the embodiments of FIGS. 12A-12F and 13A-13F. In this embodiment, the item retainer is shaped flat with a folded end to fit inside the vertical member. Retention is by a feature of the item retainer that is inserted into an interior of the vertical member.

Figure 15A:
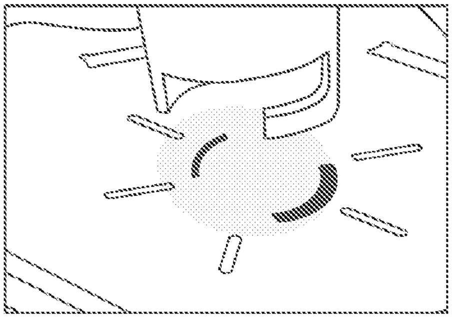
Figure 15B:
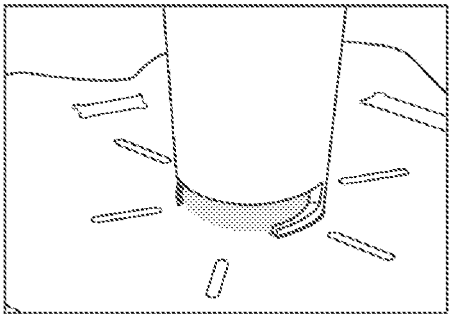
Figure 15C:
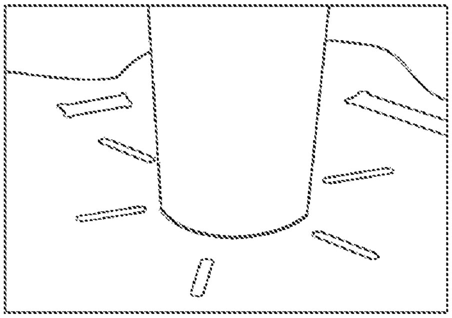
Figure 15D:
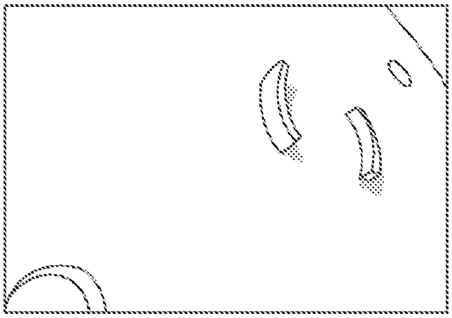
Figure 15E:
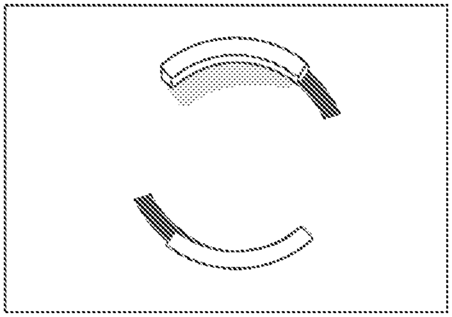
Figure 15F:
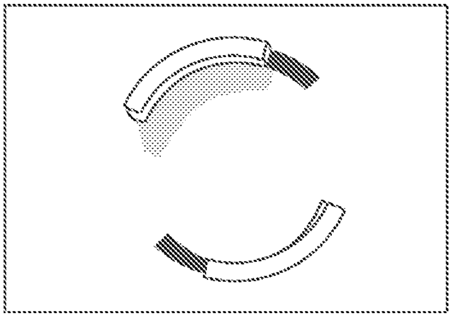

FIGS. 15A-15F are different views showing attachment of a vertical member to a base member in accordance with embodiments of the present disclosure. Referring to FIGS. 15A-15F, arc shapes are cut in the base member. A bottom portion of the vertical member is shaped and sized to fit into the arc shapes for securing the vertical member to the base member. FIGS. 15A-15C show the top of the base during the attachment process, and FIGS. 15D-15F show the bottom of the base during the attachment process. Steps include inserting the vertical member into the arc slots of the base member and then rotating the vertical member about its axis. A small bump feature is included on the end of the vertical member to fit into a small hole in the base member to prevent the vertical member to loosen after being turned into place.

FIGS. 16A-16C are different views showing a vertical member of a storage holder being supported by multiple buttressing components in accordance with embodiments of the present disclosure. Referring to FIGS. 16A-16C, the buttressing components are rigidly attached to the vertical member and base member such that the vertical member is held in place. Additionally, the attachment of buttressing components prevents rotation of the vertical member.

FIG. 17 is a top view of a base member 108 with media gauges 1700 affixed thereto for measuring an amount of roll material in accordance with embodiments of the present disclosure. Referring to FIG. 17, as described herein a roll may be retained directly on top of a slot 200. Thus, the roll is centered on the slot 200. A respective media gauge 1700 has indicia of measurement of the material on the roll based on the thickness of the roll extending from its axis aligned with the center of the slot 200. In this way, a user can read the indicia on the gauge at the widest point of the roll to determine an amount of material or how much material remains on the roll. The gauge 1700 can be stand alone or also incorporated into a base of rotating vinyl rack. A conversion table may be used to calculate media with different roll core thickness.

FIG. 18 is a close up via of a media gauge 1700 in accordance with embodiments of the present disclosure. The media gauge 1700 can be used to determine how much media or material is left in a partial roll. It can be used on multiple material thickness. The media gauge 1700 can be printed on clear material to place on top of the roll middle and read from the top. For assembly, the slot 200 can be fit into the base member and the media gauge 1700 aligned with a center of the roll. The number on the gauge 1700 can be read to determine the amount of material left on a roll. Numbers may be read in any suitable unit, such as feet. There can be multiple axis for multiple types of media.

It is noted that the items being organized or stored do not necessarily have to be round. The bottom and top retainer can be modify to accept any suitable shapes center of rolls or items.

In accordance with embodiments, the vertical member may be a shape other than cylindrical as shown in the figures. In other examples, the vertical member may be a hexagonal shaped pipe with 6 or more faces to accept the retainers and more or less rolls.

The flower shape of the base member (e.g., base member 108) can allow for ease of rotation with foot or hand, but it also provides access to lift the roll from near its core to prevent lifting the roll from the media itself.

The sliding top retainer allows for one-hand removal of a light weight roll.

The top retainer can have areas for writing or holes for hang tags to possibly write on and/or identify the media in that particular position. They could also be of color to identify media kind.

The top plate that is used to facilitate rotation, may also be used as small tool storage (e.g., scissors, measuring tape, etc.).

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A storage holder comprising:

a base member configured to hold a lower portion of an item;

a vertical member supported by the base member and defining a plurality of apertures, wherein the apertures are spaced apart in a substantially vertical direction, and wherein each aperture defines an upper surface and a lower surface that are aligned in the vertical direction and spaced apart by a first distance; and one or more item retainers that are each configured to hold an upper portion of an item, wherein each item retainer comprises a locking feature configured to fit within at least one of the apertures of the vertical member and to hold onto the vertical member, wherein the locking feature defines a base, an upper arm and a lower arm for holding the respective item retainer to the vertical member, wherein while fitted in a respective aperture, each item retainer is moveable between a first position and a second position, wherein in the first position a lower surface of the base contacts the upper surface of the aperture, wherein in the second position an upper surface of the base contacts the upper surface of the aperture, wherein in the first position the respective retainer holds the upper portion of the respective item in a stored position, and wherein in the second position the respective retainer releases the upper portion from the stored position or receives the upper portion for storage.

2. The storage holder of claim 1, wherein the vertical member is attached to a substantially center portion of the base member, wherein the vertical is rotatable about the vertical member.

3. The storage holder of claim 1, wherein the apertures are each shaped as a slot aligned along the substantially vertical direction.

4. The storage holder of claim 1, wherein the item defines an opening at the upper portion and an opening at the lower portion, and wherein the item retainer defines a protrusion that extend in a downward direction for fitting into the opening of the upper portion for holding the item.

5. The storage holder of claim 4, wherein the base member comprises one or more protrusions that extend in an upward direction for fitting into the opening of the lower portion for holding the item.

6. The storage holder of claim 1, wherein each retainer is configured to rest on a lower portion of its respective aperture of the vertical member when in the first position.

7. The storage holder of claim 6, wherein each retainer touches a top portion of its respective aperture of the vertical member when in the second position.

8. The storage holder of claim 7, wherein each retainer is moveable between the first position and the second position along a vertical direction.

9. The storage holder of claim 1, further comprising a handle attached to a top portion of the vertical member.

10. The storage holder of claim 1, further comprising a plurality of wheels operably connected to an underside of the base member.

11. The storage holder of claim 10, wherein the wheels are caster wheels.

12. The storage holder of claim 1, wherein the vertical member is rigidly attached to the base member.

13. The storage holder of claim 1, wherein each of the one or more retainers are removable from a respective aperture of the vertical member.

14. The storage holder of claim 1, wherein each of the one or more retainers is configured to fit to and secure to any of the apertures in the substantially vertical direction for holding different sized items between the respective retainer and the base member.

15. A method for holding an item, the method comprising:

providing a storage holder comprising:

a base member; and a vertical member supported by the base member and that defines a plurality of apertures, wherein the apertures are spaced apart in a substantially vertical direction, and wherein each aperture defines an upper surface and a lower surface that are aligned in the vertical direction and spaced apart by a first distance; and fitting a locking feature of an item retainer within a selected one of the apertures, wherein the locking feature defines a base, an upper arm and a lower arm for holding the respective item retainer to the vertical member, wherein while fitted in the selected aperture, the item retainer is moveable between a first position and a second position, wherein in the first position a lower surface of the base contacts the upper surface of the aperture, wherein in the second position an upper surface of the base contacts the upper surface of the aperture, wherein in the first position is lower than the second position;

raising the item retainer to the first position and positioning an upper portion of an item in relation to the item retainer such that the upper portion of the item is held by the item retainer; and positioning a lower portion of the item in relation to the base member such that the lower portion of the item is held by the base member, wherein the item is in a stored position when the item retainer holds the upper portion and the base member holds the lower portion.

16. The method of claim 15, wherein the apertures are each shaped as a slot aligned along the substantially vertical direction.

17. The method of claim 15, further comprising lower the retainer to the second position such a portion of the retainer fits within a portion of the item.

18. The method of claim 15, wherein the item defines an opening at the upper portion and an opening at the lower portion, and wherein the item retainer defines a protrusion that extend in a downward direction for fitting into the opening of the upper portion for holding the item.

19. The method of claim 18, wherein the base member comprises one or more protrusions that extend in an upward direction for fitting into the opening of the lower portion for holding the item.

20. The method of claim 15, further comprising:

raising the item retainer such that the upper portion of the item is released from the item retainer; and subsequent to raising the item retainer to release the upper portion of the item, lifting the item away from the base member, wherein the item is in a released position after raising the item.

* * * * *